United States Patent [19]

Alieri

[11] 4,270,893

[45] Jun. 2, 1981

[54] MOLD FOR MOLDING HOLLOW BRICKS BY MEANS OF A PRESS

[76] Inventor: Rodiero Alieri, Via Liverani, 7, Imola (Bologna), Italy

[21] Appl. No.: 54,521

[22] Filed: Jul. 2, 1979

[30] Foreign Application Priority Data

Jul. 7, 1978 [IT] Italy ............................ 3489 A/78

[51] Int. Cl.³ ............................ B29C 3/00

[52] U.S. Cl. ............................ 425/415

[58] Field of Search ............................ 425/415

[56] References Cited

U.S. PATENT DOCUMENTS

| | | | |
|---|---|---|---|
| 2,209,404 | 7/1940 | Lassman | 425/415 |
| 3,041,701 | 7/1962 | Gates | 425/415 |
| 3,775,032 | 11/1973 | Smith et al. | 425/415 |
| 3,802,818 | 4/1974 | Watanabe | 425/415 |
| 4,128,376 | 12/1978 | Albertazzi | 425/415 |

*Primary Examiner*—John Parrish

*Attorney, Agent, or Firm*—Guido Modiano; Albert Josif

[57] ABSTRACT

Mold for molding hollow bricks by means of a press, comprises at least one punch affixed to the movable crosspiece of the press. A die is provided with at least one cavity for containing the material to be pressed and is engageable by the punch during the pressing step. At least one counterpunch constitutes the bottom of the die cavity and is movable between a position where it rests on the press base and a position where it ejects the molded brick. The die is supported in a yielding manner vertically with respect to the press base. Rod-like elements adapted for forming the holes through the bricks are rigid with the die. The rod-like elements penetrate the counterpunch and the cavity and are further adapted for inserting themselves in respective seats in the punches during the pressing step.

2 Claims, 4 Drawing Figures

MOLD FOR MOLDING HOLLOW BRICKS BY MEANS OF A PRESS

BACKGROUND OF THE INVENTION

This invention relates to a mold for molding hollow bricks by means of a press. The invention is particularly useful to mold hollow bricks from a clay blank.

Bricks have been proposed the design whereof is intended for speeding up the erection of masonry walls while eliminating the need for any special alignment and plumb procedures, such that the erection can be completed even by unqualified personnel.

Such bricks, as shown in FIG. 1 of the accompanying drawings illustrating a typical brick in perspective view, have a substantially double "H" configuration, with two longitudinal webs 1',2' interconnected by bridges 3',4'. Between the bridges 3',4', there is left a square hole 5', while at the opposing ends of the brick rectangular recesses 6',7' are provided which, upon arranging the bricks to abut against one another in a row, originate further holes which are identical to the holes 5'. The bridges 3',4' are penetrated by cylindrical holes 8,9 through which plugs are inserted for interconnecting the bricks in overlapped relationship. In the top and bottom faces of the brick, between the bridges and webs, there are formed grooves 10',11' of semicircular cross-section which extend over the entire length of the brick. Finally, a setback 12' surrounds the brick face which is intended to be left exposed.

SUMMARY OF THE INVENTION

This invention sets out to provide a mold which, when installed in a press, affords the possibility of molding bricks of the general type just described.

Within that general aim, it is possible to arrange that the mold according to the invention is of simple construction, easy to manufacture, reliable in operation, and easily cleaned.

According to one aspect of the present invention, there is provided a mold comprising at least one punch affixed to the movable crosspiece of the press, a die provided with at least one cavity for containing the material to be pressed and engageable by said punch during the pressing step, a counterpunch constituting the bottom of said cavity and being movable between a position where it rests on the press base and a position where it ejects the molded brick, said mold being characterized in that said die is supported in a yielding manner vertically with respect to the press base, with said die there being rigidly connected rod-like elements adapted for forming the holes through the bricks, said rod-like elements penetrating said counterpunch and cavity and being further adapted for inserting themselves in respective seats in the punches during the pressing step.

BRIEF DESCRIPTION OF THE DRAWINGS

Further features and advantages will be more clearly apparent from the following description of a preferred embodiment, illustrated by way of example in the accompanying drawings, where.

DESCRIPTION OF THE PREFERRED EMBODIMENTS

Figure 1:
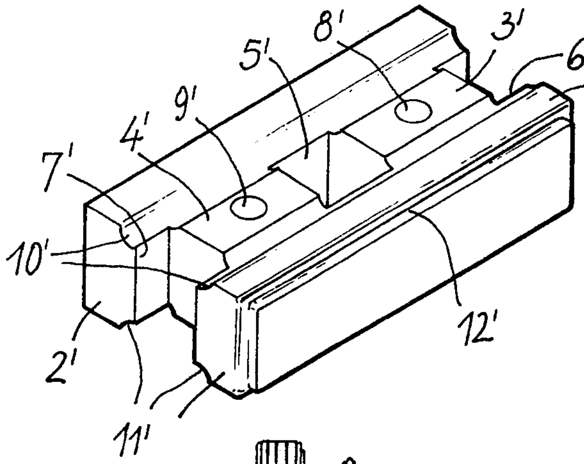
FIG. 1 is a perspective view of a hollow brick.
Figure 2:
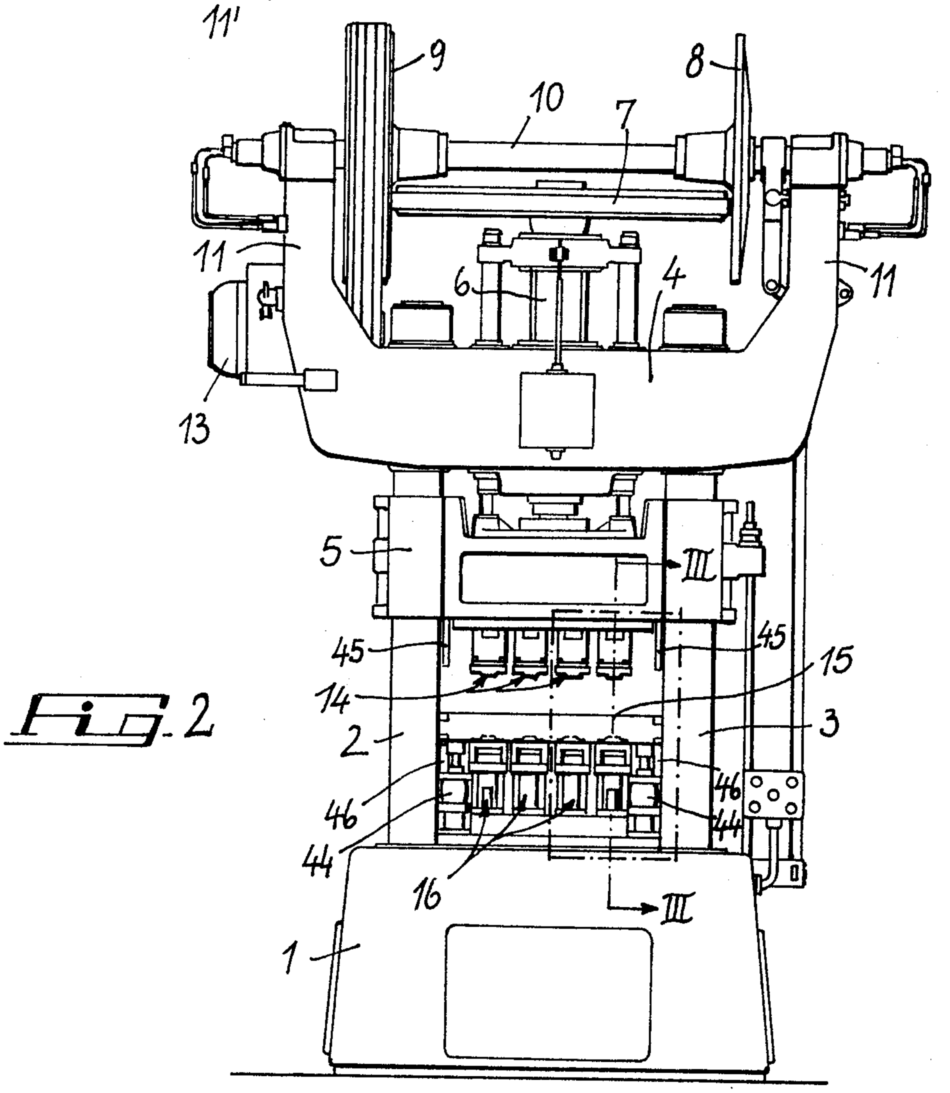
FIG. 2 is an elevational view of a friction press equipped with a mold according to this invention.

With reference to the drawing figures, the press for molding hollow bricks is of the friction type. It comprises a base 1 from which two cylindrical columns or uprights 2,3 extend vertically which are interconnected at the top by a fixed crosspiece 4. On the columns 2,3 is slidably guided the movable crosspiece 5 the upward and downward movements whereof are controlled by a so-called auger screw 6 rotatively engaging the crosspiece 4. The movement of the auger screw 6 is obtained by means of frictional contact between a disk 7 keyed to the auger screw top and disks 8,9 keyed to a shaft 10 which is horizontally carried in stands 11 presented by the fixed crosspiece 4. The disk 9 is in the form of a pulley for kinematic connection, through drive belts 12, to a drive motor 13. The auger screw upstroke and downstroke, namely its rotation in either directions, is effected by alternately bringing the disks 8,9 close to the disk 7.

To the movable crosspiece 5, there are attached punches 14 which constitute the upper half-mold of the press. The lower half-mold comprises a die 15 and counterpunches 16.

Figure 3:
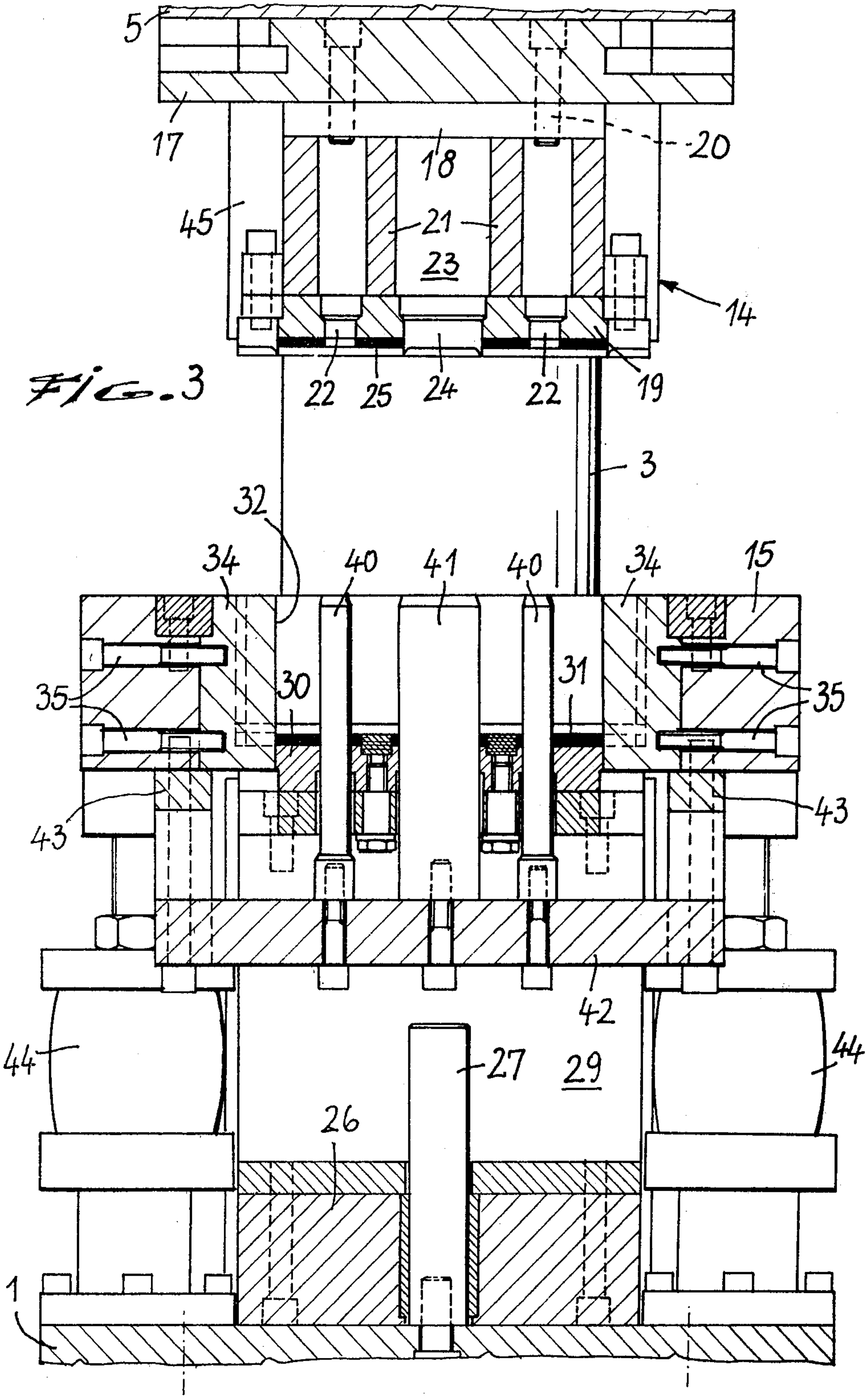
FIG. 3 is a sectional view taken along the line III—III of FIG. 2.
Figure 4:
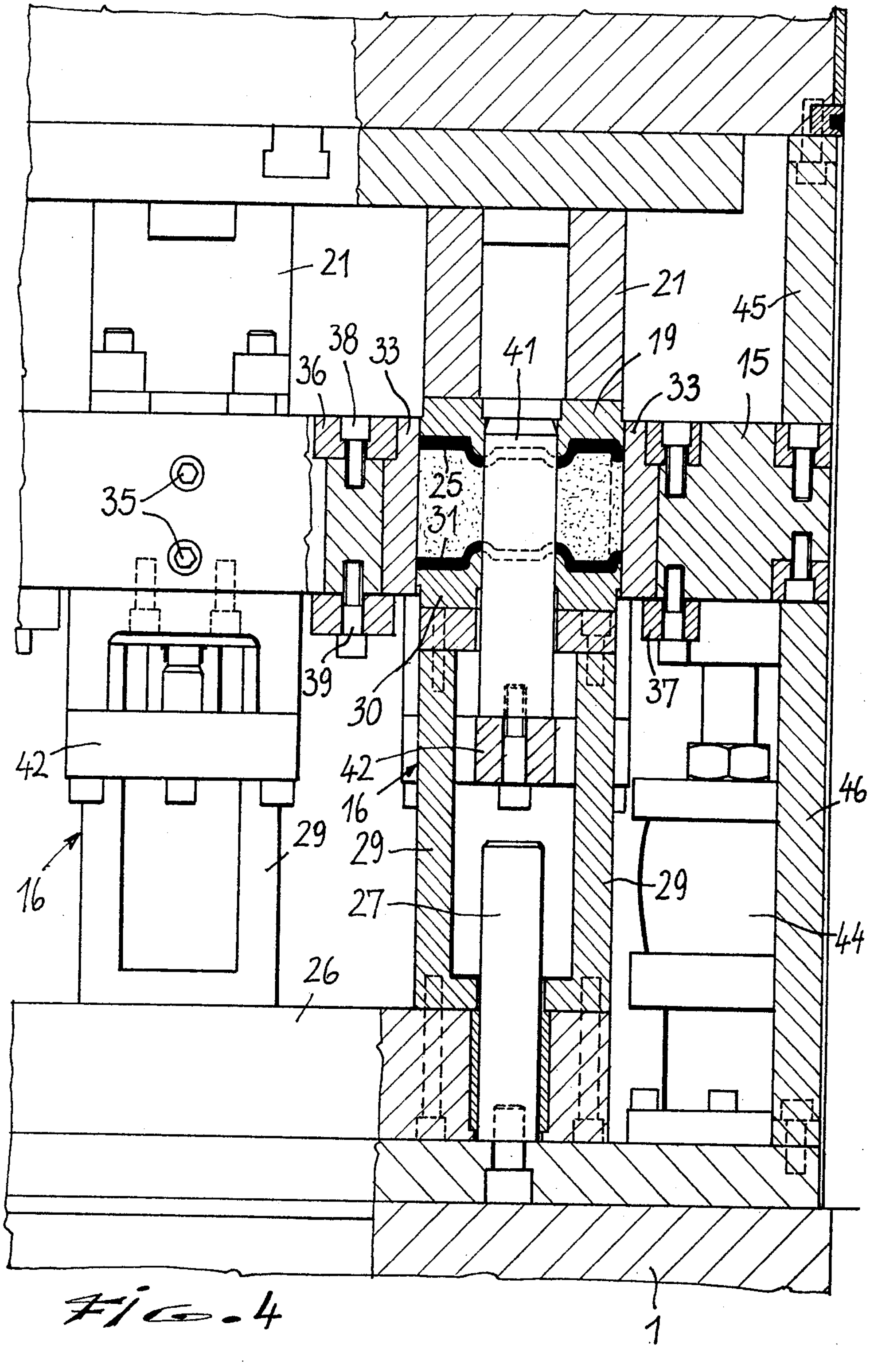
FIG. 4 is an enlarged scale, partly sectional, view of the detail enclosed in the dash-and-dot block of FIG. 2.

As shown more in detail in FIGS. 3,4, the punch assembly is attached to a plate 17 affixed to the movable crosspiece 5. To the bottom of the plate 17 is secured a plate 18, by means of screws 20 engaging it from above. The plate 18 carries, for each punch, a pair of hollow spacer members 21, to the lower ends whereof there are attached the punches 19 proper. The members 21 are aligned with through holes 22 in the punch, and a cavity 23 is defined therebetween which is aligned with an opening 24 of the punch 19.

The holes 22 and opening 24, as will be more clearly explained hereinafter, are intended for receiving the rod-like elements therethrough which will produce the holes 5'–9' in the brick.

The punch 19 has a surface mating that of the brick shown in FIG. 1. That surface will be suitably coated with a layer of an elastic material, such as rubber, indicated at 25. Alternatively, that material could be of the type known under the tradename ADIPRENE.

On the base 1 of the press, a plate 26 is arranged to rest, whereto the cited counterpunches 16 are attached. The plate 26 is movable vertically by means of a lifter accommodated in the base 1, such as to raise the counterpunches to the die level for ejecting the molded bricks. The plate 26 is guided on rods 27 extending from the base 1, whereto they are secured by means of bolts 28.

The counterpunches comprise pairs of shoulders 29 which support the counterpunch 30 proper at the top. The counterpunch has a surface which is a mirror-image of the surface of the punch 19, i.e. mating the second face of the brick to be molded. The counterpunch 30 is also coated with a layer 31 of a material entirely similar to that of the layer 25.

The counterpunch 30 is guided in a cavity or hollow part 32 of the die 15, which has an entirely conventional structure. The cavity 32 is confined between walls 33 and 34, located opposite each other, which are secured to the die by means of bolts 35. In order to avoid the possibility that, owing to the stresses involved in the pressing step, the walls 33, 34 tend to move out of their seats in the die 15, there are provided upper stringers 36 and lower stringers 37 which effectively lock the walls against vertical movements. The stringers 36,37 are secured by bolts 38,39. The counterpunch 30 has holes in alignment with the punch holes, wherethrough cylindrical rods 40 and a square cross-section tailpiece 41 are arranged to penetrate. The rods 40 and tailpiece 41 are attached to a bridge 42 which extends beneath the die 15 between the shoulders 29. The bridge 42 is also connected to the die by means of uprights 43.

The mold described in the foregoing is then completed by a die elastic support, comprising rubber shock absorbers generally indicated at 44 and located at the die corners.

The press is operated in a conventional manner.

After the cavities 32 of the die have been loaded with the material to be pressed, the punches 19 are lowered and, by penetrating the cavities 32, said punches 19 will press the material therein. It should be noted that while the punches 19 engage the cavities 32, the rods 40 and tailpiece 41 penetrate the holes 22,24 to seal the molding, space. Upon completion of the pressing step, and after the upper punches have been raised to the position shown in FIG. 3, the counter-punches are raised such as to bring the molded brick to the level of the top surface of the die 15. Purposely provided ejecting members will then move the bricks towards a transporting conveyor.

The invention is particularly useful, as mentioned in the preamble, for molding bricks from a clay blank. This blank is in practice a body which reproduces the coarse shape of the finished brick and is cut off an extruded paraison of clay on extruding machines. The blank, by means of members foreign to this invention, is then introduced into the cavity 32 such that the rods 40,41 can engage the holes preformed in the blank. Thereafter, the pressing step is carried out by inserting the punches 14 into the die cavities.

However, it is important, in some conditions, that the die, during the punch downstroke, be allowed to follow somewhat the movement of the punches, as permitted by the shock absorbers 44 which carry it. For this purpose, there are provided on the top or upper crosspiece, shoulders 45 which engage with the die 15 as the punches penetrate the cavities 32 and drive it downwards. Suitably provided abutments 46 which extend from the base upwards and are aligned with the shoulders 45 will function as end-of-travel stops for the punches 19, and accordingly, for the die.

The invention thus achieves its objects. In addition to the cited vertical movability of the die, of considerable importance is the provision for layers 25,31 covering the active or working surfaces of the punches. In fact, during the pressing step, clay could leak through the interstices left between the punch peripheral surfaces and the inner wall of the cavities 32. By contrast, the layers 25,31, by elastic deformation during the pressing operation, are urged against the inner wall of the cavities to thus block any material from leaking. Moreover, the layers 25,31 will prevent the clay material from sticking to the punch surfaces.

The invention is susceptible to many modifications and variations, all of which are intended to fall within the instant inventive concept. Thus, for example, the number of the rods for forming the holes through the bricks may vary to suit individual requirements. Furthermore, the configurations of the punches may be modified in accordance with the desired configuration of the finished brick.

In practicing the invention, all the details may be replaced with other technically equivalent ones.

I claim:

1. A mold for molding bricks from a blank of plastic clay material in combination with a press having a movable crosspiece and comprising at least one punch affixed to the movable crosspiece of the press, a die supported in a yielding manner vertically with respect to the press base and provided with at least one cavity for containing the material to be pressed and engageable by said punch during the pressing step, at least one counterpunch constituting the bottom of said cavity and being movable between a position where it rests on the press base and a position where it ejects the molded brick, wherein according to the improvement the mold further comprises layers of elastic rubber-like material, coating the opposite surfaces of said punch and counterpunch, shoulders rigid with said movable crosspiece and effective to engage with said die after said punch has engaged the material containment cavity and abutments extending from said base and defining the lower stop form said die after the latter has been engaged by the shoulders.

2. A combination as claimed in claim 1 and further comprising rod-like elements rigidly connected to said die and extending through said counterpunch into said material containing cavity and engageable in respective seats of the punch.

* * * * *